US006856895B2

(12) United States Patent
Hashida

(10) Patent No.: US 6,856,895 B2
(45) Date of Patent: Feb. 15, 2005

(54) NAVIGATION APPARATUS

(75) Inventor: Masaya Hashida, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/138,301

(22) Filed: May 6, 2002

(65) Prior Publication Data
US 2002/0169544 A1 Nov. 14, 2002

(30) Foreign Application Priority Data
May 8, 2001 (JP) .......................... 2001-137206

(51) Int. Cl.$^7$ ............................................. G01C 21/00
(52) U.S. Cl. ....................... 701/207; 340/995; 340/988; 342/357.06
(58) Field of Search ................................ 701/200, 209, 701/211, 207, 208, 213, 214, 215; 340/988, 932.2, 995, 990; 342/357.06, 357.08, 357.13, 180

(56) References Cited

U.S. PATENT DOCUMENTS

| 5,568,390 | A | | 10/1996 | Hirota et al. | |
|---|---|---|---|---|---|
| 5,828,987 | A | * | 10/1998 | Tano et al. | 702/150 |
| 6,157,342 | A | * | 12/2000 | Okude et al. | 342/357.13 |
| 6,178,377 | B1 | * | 1/2001 | Ishihara et al. | 701/200 |
| 6,212,472 | B1 | * | 4/2001 | Nonaka et al. | 701/208 |
| 6,453,235 | B1 | * | 9/2002 | Endo et al. | 701/211 |
| 2001/0003169 | A1 | * | 6/2001 | Kaneko et al. | 701/208 |
| 2001/0007090 | A1 | * | 7/2001 | Irie et al. | 701/211 |
| 2001/0014849 | A1 | * | 8/2001 | King et al. | 701/210 |
| 2001/0029429 | A1 | * | 10/2001 | Katayama et al. | 701/209 |
| 2001/0037177 | A1 | * | 11/2001 | Nishida et al. | 701/211 |
| 2001/0037305 | A1 | * | 11/2001 | Mochizuki | 705/52 |
| 2001/0044696 | A1 | * | 11/2001 | Saitou et al. | 701/213 |
| 2001/0052861 | A1 | * | 12/2001 | Ohmura et al. | 340/988 |
| 2001/0056326 | A1 | * | 12/2001 | Kimura | 701/208 |
| 2002/0138196 | A1 | * | 9/2002 | Polidi et al. | 701/208 |

FOREIGN PATENT DOCUMENTS

| DE | 199 45 121 A1 | 4/2001 |
|---|---|---|
| EP | 0 772 174 A1 | 5/1997 |
| JP | 09-297030 | 11/1997 |
| JP | 10-253352 | 9/1998 |
| JP | 10-307036 | 11/1998 |
| JP | 10-307037 | 11/1998 |

OTHER PUBLICATIONS

Japanese Abstract No. 2000310540, dated Nov. 7, 2000.

* cited by examiner

Primary Examiner—Thomas G. Black
Assistant Examiner—Tuan C To
(74) Attorney, Agent, or Firm—Sughrue Mion, PLLC

(57) ABSTRACT

Map data stored in a memory includes normal road data and additional road data for predetermined regions along a highway. A current location of a moving body is detected by sensor(s). The normal road data or additional road data is selected on the basis of the detected current location of the moving body. A map matching process is performed with the selected road data. Accordingly, the current location of the moving body is determined in the map matching process with high accuracy.

28 Claims, 8 Drawing Sheets

FIG. 6

| NORMAL ROAD DATA | ADDITIONAL ROAD DATA |
|---|---|
| DA0 | |
| DA1 | |
| DA2 | DA'2 |
| DA3 | DA'3 |
| DA4 | DA'4 |
| DA5 | DA'5 |
| DA6 | DA'6 |
| DA7 | |
| ⋮ | |
| DAn-1 | |
| DAn | |

FIG. 7

| STORY | MAP DATA |
|---|---|
| 4TH STORY | DATA4 |
| 3RD STORY | DATA3 |
| 2ND STORY | DATA2 |
| 1ST STORY | DATA1 |
| 1ST BASEMENT | DATAB1 |
| 2ND BASEMENT | DATAB2 |
| 3RD BASEMENT | DATAB3 |

NAVIGATION APPARATUS

BACKGROUND OF THE INVENTION

1. Field of the Invention

The present invention relates to a navigation apparatus for detecting a current location of a mobile body.

2. Description of the Related Art

One type of known car navigation apparatus uses a recording medium such as CD-ROM which has map data stored therein. The map data includes road data which represent locations (or points) along streets/roads on a map by numbers. The car navigation apparatus detects a current location of the car and a moving direction of the car by using various sensors when the car is operated (or moving). At the same time, the car navigation apparatus reads a group of map data covering a certain area, which includes the current location of the car, from the recording medium to show a map of the area around the car in a display unit. The current location and moving direction of the car are both indicated automatically in the displayed map.

In the past, the navigation apparatus relies upon two navigation schemes. One scheme is self-contained navigation and the other scheme is GPS (global positioning system) navigation. The self-contained navigation utilizes self-contained sensors (e.g., acceleration sensor and angular velocity sensor) integrated in the navigation apparatus and does not receive any external support or information. The acceleration sensor and angular velocity sensor are used to detect (measure) navigation parameters such as acceleration and angular velocity of the car. The GPS navigation utilizes a plurality of artificial satellites which send measurement data (position data) to the navigation apparatus. The self-contained navigation has advantages and disadvantages, and the GPS navigation has advantages and disadvantages. In recent times, therefore, hybrid navigation is generally used, which combines (compares) measurement data supplied from the self-contained navigation with measurement data supplied from the GPS navigation.

In order to improve detection accuracy of a current car location provided by the self-contained navigation or GPS navigation, a map matching technique is also employed. The map matching technique or process causes the detected car location to shift to the road of the map data (road corresponding to the map data) while the car is moving, if the detected car location deviates from the road of the map data. One example of such map matching process is disclosed in Japanese Patent Kokai No. 10-307037.

In the map matching process disclosed in Japanese Patent Kokai No. 10-307037, map data is used, which is stored beforehand in a storage device. The map data indicates a location of the car on a road for map matching. The map data includes a region, in which a current car location obtained by the self-contained navigation or GPS navigation is present, and read from the storage device. Then, the car location on the road of the map data, read from the storage device, is compared with the car location obtained by the self-contained or GPS navigation. However, the car location on the road indicated in the map data is sometimes inappropriate for a driver of the car since an actual location of the car on the real road is very different from the car location presented by the map data when the car is moving under certain running conditions and/or in a certain area of the road (e.g., it depends which floor of a five-story parking garage (tower) the car is heading for or which lane of a three-lane highway the car is taking). In addition, map data itself is often not available in the storage unit for a particular location or region on the earth. As a result, the current location of the car cannot always be determined with high accuracy. This problem is also true to other types of navigation apparatus designed for other mobile bodies, such as a human.

SUMMARY OF THE INVENTION

An object of the present invention is to provide a navigation apparatus that can determine a current location of a moving body with high accuracy by a map matching process.

According to one aspect of the present invention, there is provided a navigation apparatus comprising: a current position detector for producing data about a current location of a mobile body on the basis of at least one of navigation parameters of the mobile body and measurement data supplied from a plurality of artificial satellites; a storage device for storing map data which includes road data representing one route on a road, the map data also including additional road data for a predetermined region on the road, the additional road data representing another route on the road other than the one route; and a map matching device for applying a map matching process to the data produced by the current position detector, using the road data, to determine the current location of the mobile body when the mobile body is not adjacent to the predetermined region, and for applying the map matching process to the data produced by the current position detector, using either the additional road data or the road data depending upon a moving condition of the mobile body, to determine the current location of the mobile body when the mobile body is adjacent to or in the predetermined region. It is therefore possible to determine the current location of the mobile body by the map matching process with high accuracy.

According to another aspect of the present invention, there is provided a navigation apparatus for determining a current location of a mobile body which moves in a multi-story building, comprising: a current position detector for producing data about the current location of the mobile body on the basis of at least one of navigation parameters of the mobile body and measurement data supplied from a plurality of artificial satellites; a story detector for detecting a story of the multi-story building in which the mobile body is present; a storage device for storing map data which includes a plurality of road data representing a plurality of stories of the multi-story building respectively; and a map matching device for retrieving road data representing the story detected by the story detector from the storage device, and applying a map matching process to the data produced by the current position detector, using the retrieved road data, to determine the current location of the mobile body.

BRIEF DESCRIPTION OF THE DRAWINGS

FIG. 6 illustrates a table showing relationship between the normal road data and additional road data;

FIG. 7 illustrates a map data table for respective floors of a multi-floor car park;

DETAILED DESCRIPTION OF THE INVENTION

Embodiments of the present invention will be described in reference to the accompanying drawings.

Figure 1:
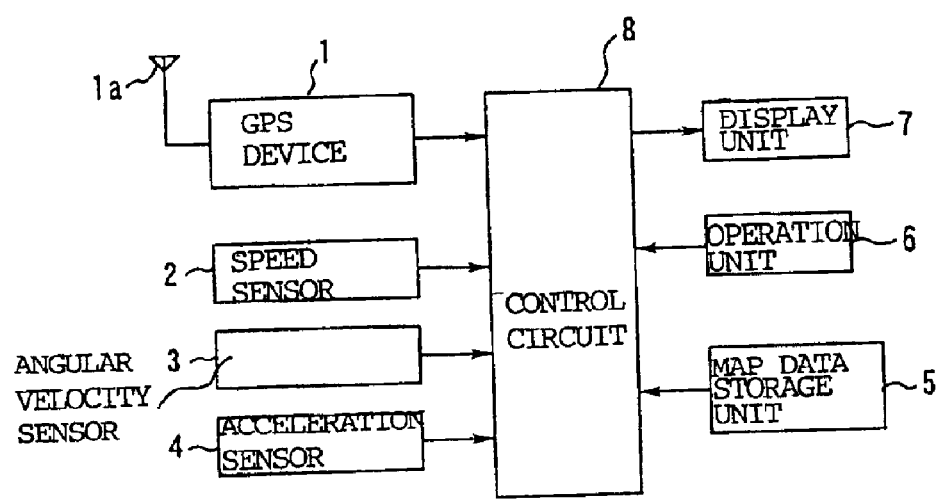
FIG. 1 illustrates a block diagram of a navigation apparatus mounted in a car.

Referring to FIG. 1, a car navigation apparatus according to one embodiment of the present invention is schematically illustrated. The car navigation apparatus is located in a car (not shown). The illustrated car navigation apparatus includes a GPS device 1, speed sensor 2, angular velocity sensor 3, acceleration sensor 4, map data storage device 5, operation unit 6, display unit 7 and control circuit 8. The GPS device 1 is connected to a GPS antenna 1a to receive radio waves (signals) transmitted from a plurality of artificial satellites (not shown) thereby calculating and determining GPS car location data including a current location of the car and a moving direction of the car on the basis of the radio waves. The speed sensor 2, angular velocity sensor 3 and acceleration sensor 4 are self-contained sensors to detect (determine) the current location and moving direction of the car without using information from outside. The speed sensor 2 detects a speed of the car. The angular velocity sensor 3 detects an angular velocity of the car. The acceleration sensor 4 detects acceleration of the car.

The map data storage unit 5 includes a recording medium such as DVD and a drive device for the recording medium. Information (data) such as map data is recorded in the recording medium beforehand. The map data storage unit 5 reads (retrieves) the map data and other information from the recording medium. The map data includes road data which represents a particular route, lane or line on an actual road. The map data also includes data about parking lots, multi-story garages (towers) and toll gates. The data about the parking lots may include confines of each parking lot, driveways in each parking lot and respective parking areas in each parking lot. The operation unit 6 is operated by a user to enter data and instructions into the navigation apparatus. The display unit 7 displays navigation (cruising) information such as a map.

The control circuit 8 is, for example, a micro computer. The control circuit 8 is connected to the GPS device 1, speed sensor 2, angular velocity sensor 3, acceleration sensor 4, map data storage unit 5, operation unit 6 and display unit 7 to control the navigation apparatus.

The control circuit 8 receives output data of the GPS device 1, speed sensor 2, angular velocity sensor 3 and acceleration sensor 4 periodically to determine the current location and moving direction of the car at predetermined intervals. The control circuit 8 then causes the display unit 7 to show a map around the current location of the car together with a car mark (car location mark). The car mark is placed at the current location of the car in the displayed map, and shows the moving direction of the car. The process for indicating the car mark in the displayed map is referred to as a car position indicating process. The car position indicating process will be described in reference to FIGS. 1 and 2.

Figure 2:
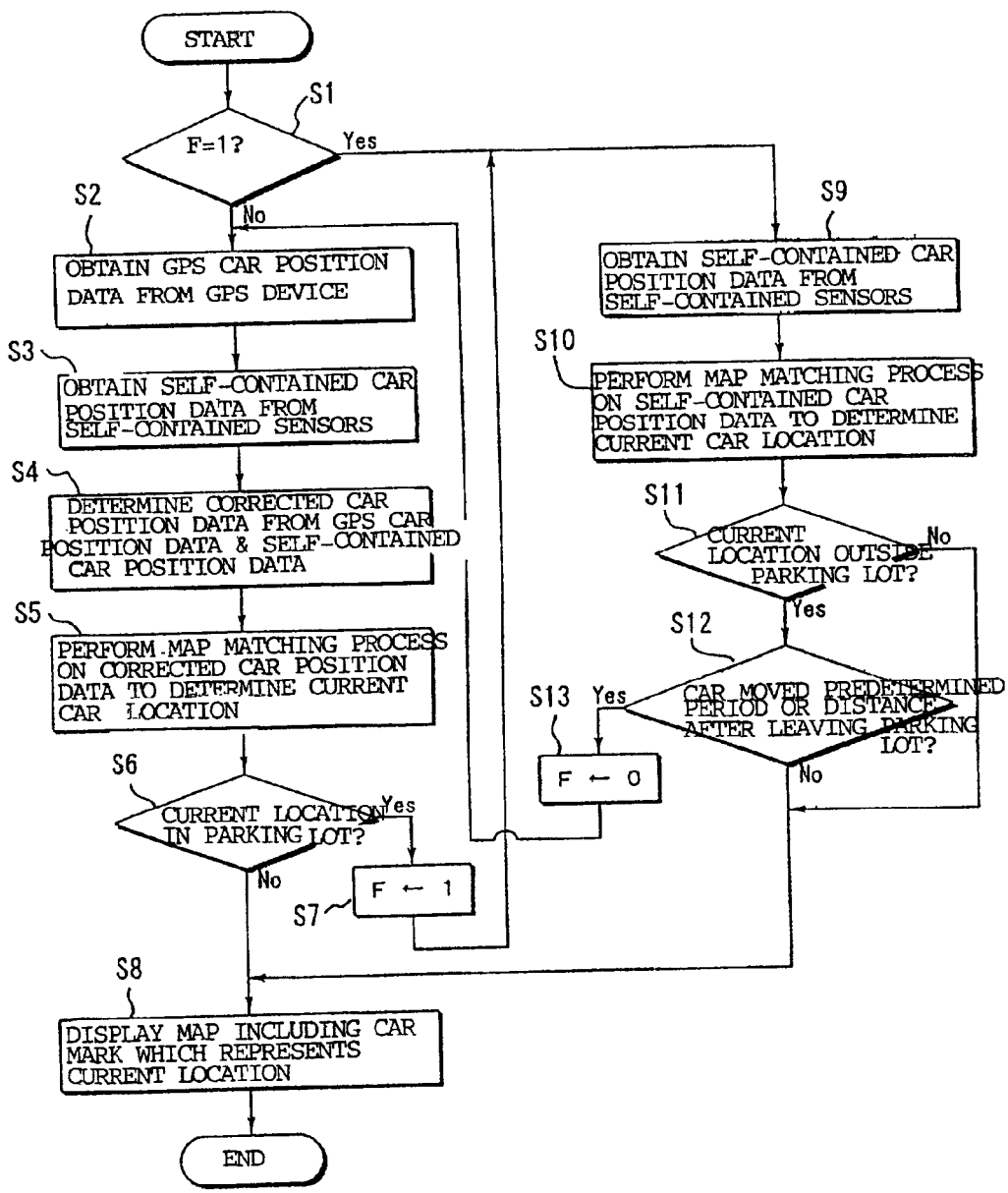
FIG. 2 illustrates a flowchart of a car location indicating process performed by a control circuit of the navigation apparatus shown in FIG. 1.

As shown in the flowchart of FIG. 2, the control circuit 8 determines whether a flag F is "1" or not (Step S1). The flag F is set to be "1" when the car is in a parking lot or tower at Step S7 (will be described). If the current location of the car is outside the parking lot or tower and the GPS device 1 can accurately determine the current location of the car, the flag F is set to "0" at Step S13 (will be described). An initial value of the flag F is "0".

When it is determined at Step S1 that F is "0", the control circuit 8 obtains GPS car position data from the GPS device 1 (Step S2). The control circuit 8 also obtains car position data from the self-contained sensors (Step S3). The car position data supplied from the self-contained sensors is referred to as self-contained car position data. Before the car position indicating process starts (or aside from the car position indicating process), the control circuit 8 periodically calculates self-contained car position data from speed, angular velocity and acceleration of the car, which are obtained from output data of the speed sensor 2, angular velocity sensor 3 and acceleration sensor 4 at prescribed intervals, and stores the self-contained car position data in a separate memory (not shown). The self-contained car position data stored in the separate memory includes the current location and moving direction of the car. The self-contained car position data is read from the separate memory at Step S3.

After Step S3, the control circuit 8 determines corrected car position data from the GPS car position data and self-contained car position data (Step S4). The control circuit 8 then performs map matching process on the corrected car position data with respect to the road derived from the map data (Step S5). At Step S4, the GPS car position data is combined to the self-contained car position data to obtain the corrected car position data. The corrected car position data includes a corrected current location of the car and a corrected moving direction of the car. A method of combining the GPS car position data with the self-contained car position data is described in detail in, for example, Japanese Patent Kokai Nos. 9-297030 and 10-30736, entire disclosures of which are incorporated herein by reference. At Step S5, the map data around the current car location is read from the map data storage device 5. If the current car location indicated by the corrected car position data is not present on the road of the map data, the current car location of the corrected car position data is forced to shift on the road of the map data. If, on the other hand, the current car location of the corrected car position data is present on the road of the map data, the current car location given by the corrected car location data is maintained.

Subsequently, the control circuit 8 determines whether the current car location determined at Step S5 is within confines of a parking lot, on the basis of the map data retrieved from the storage device 5 (Step S6). If the current car location is within the confines of the parking lot, the flag F becomes "1" (Step S7). The control program then proceeds to Step S9.

If the current car location is outside the parking lot (No at Step S6), the control circuit 8 causes the display unit 7 to show a map including the current car location determined at Step S5, together with an arrow (car mark) (Step S8). A location of the arrow in the display screen indicates the current location of the car. The arrow also indicates the heading direction of the car.

If it is determined that F is "1" at Step S1, it means that the car is within the parking lot or that the car is outside the parking lot but the current location of the car cannot be accurately detected by the GPS device 1. When F=1, therefore, the control circuit 8 obtains car position data from the self-contained sensors (Step S9). Step S9 is the same as Step S3.

After Step S9, the control circuit 8 performs the map matching process on the current car location obtained by the self-contained sensors with respect to the road derived from the map data (Step S10). At Step S10, the map data around the current car location is read from the map data storage device 5. If the current car location indicated by the self-contained navigation is not present on the road of the map data, the current car location of the self-contained navigation is forced to shift on the road of the map data. If, on the other hand, the current car location of the self-contained navigation is present on the road of the map data, the current car location given by the self-contained navigation is maintained.

Subsequently, the control circuit 8 determines whether the current car location determined at Step S10 is outside the parking lot, on the basis of the map data retrieved from the storage device 5 (Step S11). If the current car location is outside the parking lot, it is determined whether the car has moved a predetermined period or distance outside the parking lot (Step S12). If the answer is yes, the flag F becomes "0" (Step S13). The control program then return to Step S2.

If the current car location is within the parking lot (No at Step S11) or if the car has not moved the predetermined period or distance after leaving the parking lot (No at Step S12), the program proceeds to Step S8. The control circuit 8 then causes the display unit 7 to show a map including the current car location determined at Step S10, together with the car mark arrow.

In the above described car position indicating process, the current car location is determined from the GPS car position data obtained from the GPS device 1, the self-contained car position data obtained from the self-contained sensors (i.e., speed sensor 2, angular velocity sensor 3 and acceleration sensor 4) and the map matching process when the car is cruising under a normal condition (prior to entering the parking lot). On the other hand, when the car enters the parking lot and moves in the parking lot, the current car location is determined from the self-contained car position data obtained from the self-contained sensors and the map matching process. The GPS car position data from the GPS device 1 is disregarded. When the car is cruising in the parking lot, more accurate current location of the car can be obtained by simply applying the map matching process to the self-contained car position data, rather than by applying the map matching process to the combination of the GPS car position data and self-contained car position data. Even if the car exits the parking lot, the GPS car position data is still inaccurate till the predetermined period or distance is reached. Thus, the current car location is determined by applying the map matching process to only the self-contained car position data.

The road of the map data (road data) used in the map matching process is selected by a road data selection process (FIG. 3) which is repeatedly executed by the control circuit 8.

Figure 3:
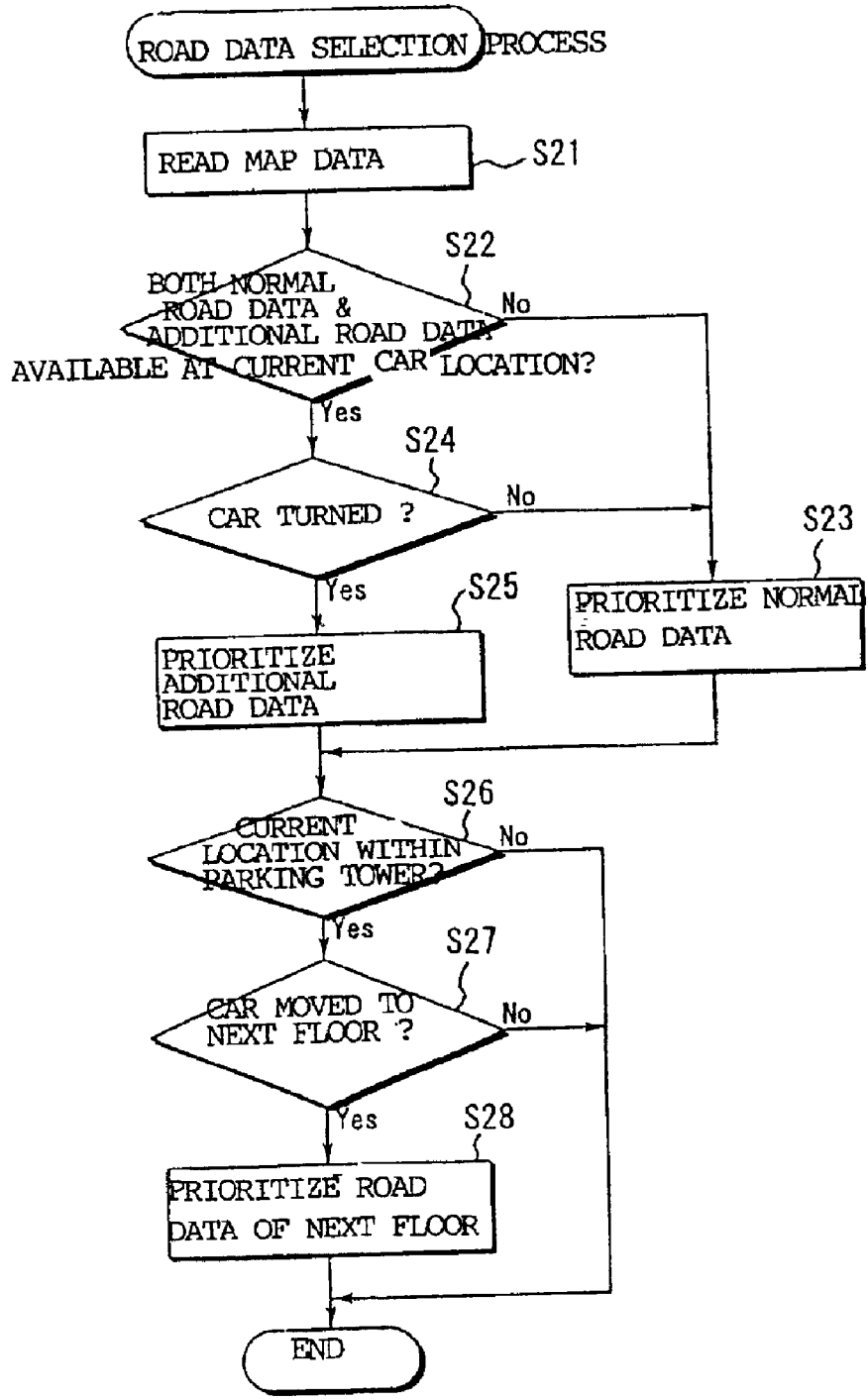
FIG. 3 illustrates a flowchart of a road data selecting process performed by the control circuit of the navigation apparatus shown in FIG. 1.

In the road data selection process shown in FIG. 3, the control circuit 8 reads map data of a region including the current car location from the map data storage device 5 (Step S21). The current car location in the flowchart of FIG. 3 may be a current car location which is most recently determined by the car location indicating process. Alternatively, the current car location in FIG. 3 may be the most recent current car location determined by the GPS device or self-contained sensors.

The control circuit 8 determines whether the map data has additional road data for the current car location (Step S22). The map data has normal (representative, standard) road data and additional road data for a certain region on the road even if the current car location is present on the road of the map data. For example, if the car is cruising on a three-lane highway (one lane for right turn, one lane for straight and one lane for left turn), the normal road data may represent the straight (center) lane and the additional road data may represent the right and left turn lanes (side lanes).

If there is no additional road data for the current car location on the road of the map data, the normal road data of the map data is selected (Step S23). If, on the other hand, the additional road data exists, the control circuit 8 determines whether the car has made a turn (Step S24). A fact that the car has turned to the right or left is known from the most recent moving direction of the car, which is obtained from the most recent GPS car position data or self-contained car position data. If the car is moving straight, the program proceeds to Step S23 to use the normal road data of the map data. If the car turns, the additional road data is used rather than the normal road data (Step S25).

Figure 4:
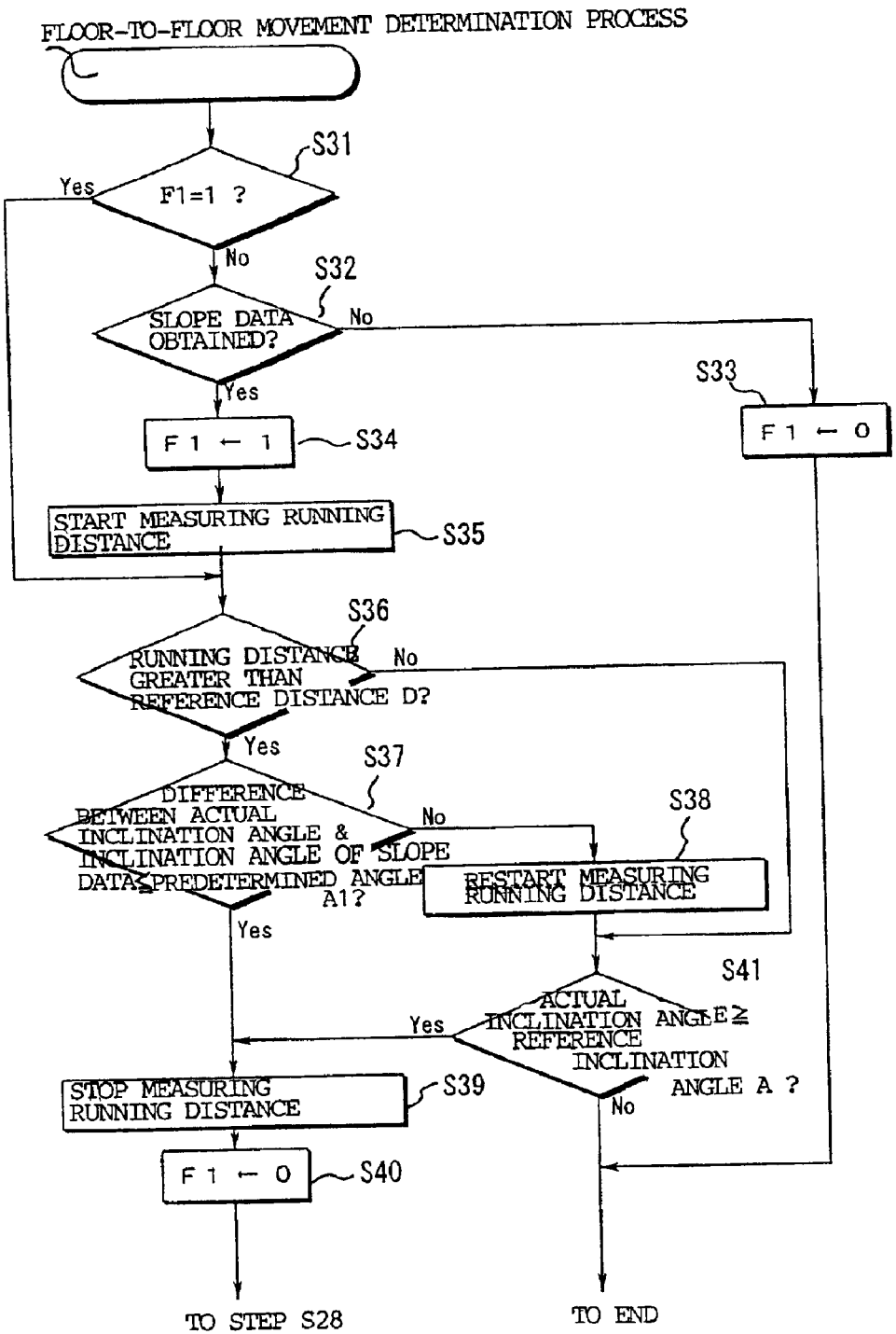
FIG. 4 illustrates a flowchart of a floor-to-floor movement determination process performed by the control circuit of the navigation apparatus shown in FIG. 1.

After Step S23 or S25, the control circuit 8 determines whether the current car location is in a parking tower (Step S26). Step S26 is similar to Step S6, but a contour polygon which defines confines of the parking tower (will be described) is utilized to make a determination at Step S26. If the current car location is within the parking tower, the control circuit 8 determines whether the car has moved to another floor in the tower (Step S27). The floors of the tower may have different features (designs, arrangements) so that different map data may be prepared for the respective floors. Step S27 is therefore necessary to know whether the car has moved to another floor. A method of determining whether the car has moved to another floor will be described in detail later (FIG. 4). If it is determined that the car is now on a different floor, road data for the current floor is utilized (Step S28). If it is determined at Step S26 that the car is outside the parking tower, or at Step S27 that the car remains on the same floor, the normal road data selected at Step S23 is continuously utilized.

Referring to FIG. 4, the determination process for the floor-to-floor movement at Step S27 will be described.

The control circuit 8 first determines whether an inclination flag F1 is "1" (Step S31). The slope (inclination) flag F1 is set to be "1" at Step S34, and an initial value of the slope flag F1 is "0". If the slope flag F1 is "0", the control circuit 8 determines whether slope data is available at the current car location (Step S32). The map data read from the storage device 5 includes the slope data when the current car location is in the vicinity of a branching point of the road and one of the enterable branching roads is a slope. The slope data includes an inclination angle of the slope. Thus, when the slope data is obtained from the map data for the current car location, it means that at least one of the branching roads has an inclination and the car can enter the inclined road.

When no slope data is available in the map data storage device 5 for the current car location, the flag F1 is set to be "0" (Step S33). Contrarily, when the slope data is obtained from the storage device 5 for the current car location, the flag F1 is set to be "1" (Step S34). The control circuit 8 then causes a running distance meter or calculator (not shown) to start counting the running distance of the car (Step S35). At Step S35, the running distance meter is initialized (to zero) to count the traveling distance of the car after the slope data is obtained. The running distance meter calculates the running distance on the basis of a car speed derived from the speed sensor 2 and a time derived from a clock. The running distance meter (calculator) may be hardware or software.

After Step S35, the control circuit 8 determines whether the running distance calculated by the running distance meter reaches a reference distance D (Step S36). If the car has run the reference distance D or more, the control circuit 8 then determines whether a difference between an actual inclination angle of the road at the current car location and the inclination angle of the slope data is equal to or smaller than a predetermined angle A1 (Step S37). The actual inclination angle of the road at the current car location is calculated in the control circuit 8 on the basis of acceleration of the car which is detected by the acceleration sensor 4. The inclination angle calculating process may be executed at the same time as Step S37 or independently.

The method of calculating the actual inclination angle is disclosed in, for example, Japanese Patent Kokai No. 10-253352, the entire disclosure of which is incorporated herein by reference, and will be described briefly below.

First, acceleration Gc applied to the car in the car moving direction is detected by the acceleration sensor 4. A traveling distance of the car is obtained on the basis of an output signal of the speed sensor 2, and differentiated twice to calculate acceleration Gb of the moving car. Then, the acceleration vector Gb is subtracted from the acceleration vector Gc to calculate a component Ga of the acceleration of gravity G in the car moving direction. Thus, Ga=Gc−Gb. The calculated acceleration Ga and acceleration of gravity G are used to calculate the actual inclination angle θ from the equation (1).

$$\theta = \sin^{-1}(|Ga|/|G|) \quad (1)$$

When the difference between the actual inclination angle and the inclination angle of the slope data is greater than the predetermined angle A1, the running distance meter is activated again to measure the reference distance D from the beginning (Step S38). On the other hand, when the difference between the actual inclination angle and the inclination angle of the slope data is not greater than the predetermined angle A1, the control circuit 8 stops the measurement of the running distance with the running distance meter (Step S39) and the flag F1 is set to be "0" (Step S40). In this case, the control circuit 8 considers that the car is moving from the current floor to a next floor. As a result, the control program proceeds to Step S28 (FIG. 3) to switch to the map data of the next floor from the map data of the current floor for the current car location. Road data is then selected form the map data of the next floor. In other words, when Step S28 is executed, the map data used for the map matching at Step S5 or S10 (car location indicating process) is changed.

When Step S36 determines that the running distance has not reached the reference distance D or when the measuring of the running distance is restarted at Step S38, the control circuit 8 determines whether the actual inclination angle is equal to or greater than the reference inclination angle A (Step S41). If the actual inclination angle is not less than the reference inclination angle A, the control program proceeds to Step S28, and the control circuit 8 considers that the car is moving from the current floor to the next floor. As a result, the map data of the current floor is changed to the map data of the next floor for the current car location. The road data is then selected form the map data of the next floor.

Figure 5:
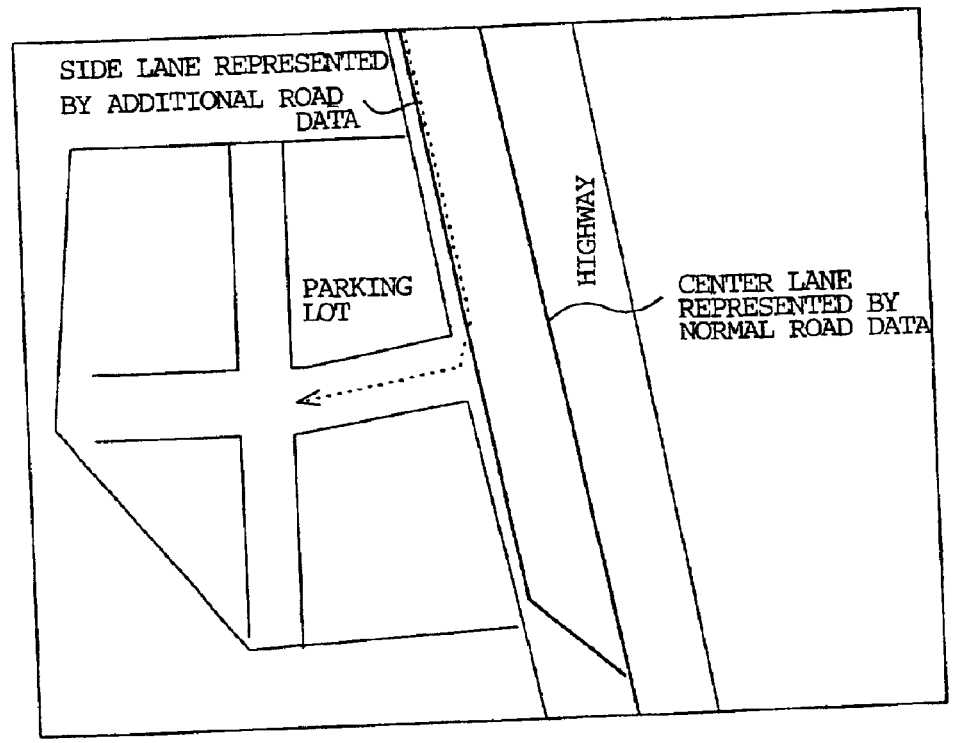
FIG. 5 illustrates normal road data and additional road data for a multi-lane highway.

As shown in FIG. 5, an entrance/exit of the parking lot or tower may face a highway which has a plurality of lanes (not shown). In the road data selection process, additional road data is available for a right turning lane (route), in addition to normal road data for a straight center lane (route) (or a center line) of the highway. FIG. 6 illustrates the normal road data and additional road data included in the map data read from the storage device 5. In FIG. 6, DA0 to DAn represent coordinates of various points along the center line of the highway to define the normal road data, and DA'2 to DA'6 represent coordinates of various points along the side lane to define the additional road data. The side lane coordinates DA'2 to DA'6 correspond to the center lane (center line) coordinates DA2 to DA6.

When the driver of the car intends to enter the parking lot, the car usually runs in the side lane and turns to the right as indicated by the broken line in FIG. 5. Therefore, if the map matching process is performed with the normal road data, certain discrepancy (deviation, error) arises between the actual running distance of the car and the running distance expected (predicted, assumed, calculated) on the basis of the map data after turning to the right. On the other hand, if the map matching process is performed with the additional road data, the discrepancy between the actual running distance and the expected running distance until the parking lot entrance after the turning is reduced. Of course, the reduced discrepancy less affects the expected running distance of the car after entering the parking lot. When the car exits the parking lot and enters the highway, the additional road data is utilized again in the map matching process to reduce the discrepancy between the actual running distance and the expected running distance after exiting the parking lot.

Figure 8A:
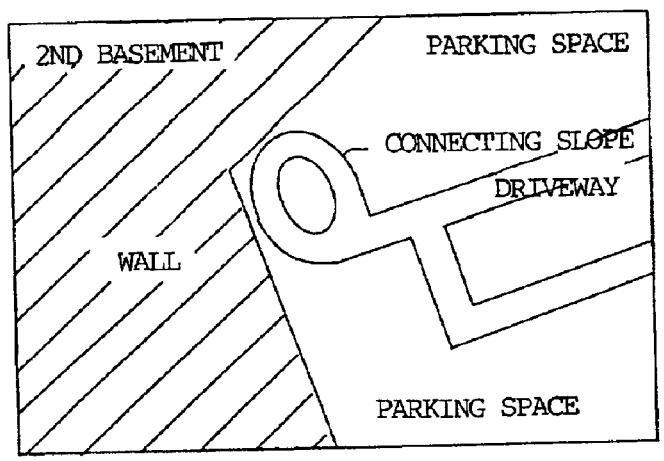
FIG. 8A illustrates a map derived from the map data of the second basement of the multi-floor car park.
Figure 8B:
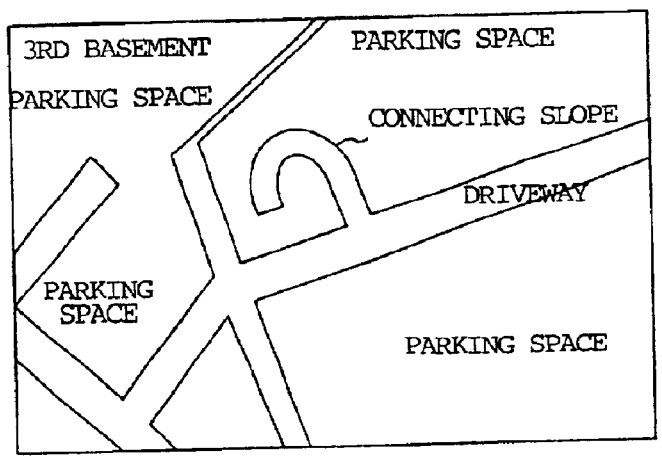
FIG. 8B illustrates a map derived from the map data of the third basement of the multi-floor car park.

If the car moves in a multi-story car park, the map data which includes road data for respective stories as shown in FIG. 7 is used. A story in which the car is currently running is detected, and the map data for the current story is utilized in the map matching process. Each story may have different arrangement or structure. For instance, as illustrated in FIGS. 8A and 8B, the parking space arrangement on the second basement may be different from that on the third basement. It should be assumed here that the car is moving from the second basement to the third basement through a connecting slope. The map data of the second basement is switched to the map data of the third basement in this embodiment at an appropriate timing. The map data of the second basement is kept displayed till the car reaches a quarter of the circle of the connecting slope. If the map data of the second basement (FIG. 8A) is immediately switched to that of the third basement (FIG. 8B) upon entering the connecting slope, a car driver may think that the car is moving through the wall.

Figure 9:
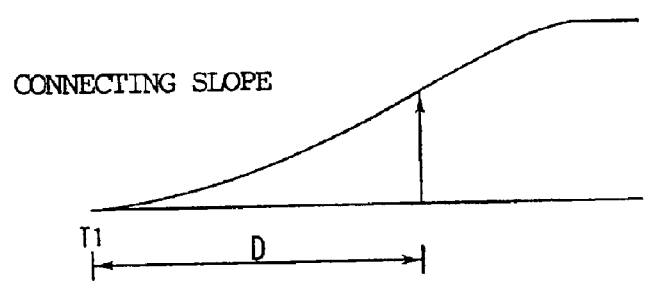
FIG. 9 illustrates a slope between two floors in the multi-floor car park, and a timing when a floor to floor movement is determined.

Referring to FIG. 9, the connecting slope between the two stories is schematically illustrated. The connecting slope is generally short and steep. The maximum inclination of the connecting slope is, for example, six to nine degrees. Step S37 of FIG. 4 is executed when the car has moved the reference distance D from the start point T1. Specifically, it is determined that the difference between the actual inclination angle and the inclination angle of the slope data is not greater than the predetermined angle A1 when the car has run the distance D. The inclination angle of the slope data is obtained at the time T1. Thus, if the driveway on the currently running story extends next to the connecting slope directed to the upper story and the car is moving to the connecting slope, the map matching process is promptly performed with the road data of the upper story after Steps S37, S39 and S40.

As described above, Step S26 in FIG. 3 determines whether the car currently exists in the parking lot or tower. This determination prevents the map matching process from being disabled when the car exits the parking lot or tower. For some reasons, the currently running story in the multi-story parking tower might be incorrectly detected and the current car location and/or moving direction might be incorrectly detected. When such incorrect detection occurred when the car moved in the parking lot/tower, the map matching to the highway outside the parking lot/tower would become impossible when the car exits the parking lot/tower. In order to prevent this, data about the confines of the parking lot or tower is stored in the storage device 5 as contour (boundary) polygon data, and Step S26 determines whether the car is outside or inside the contour polygon, when the map matching to the driveway in the parking lot/tower becomes impossible. The map matching to the highway is initiated when Step S26 determines that the car is outside the parking lot/tower.

Although not illustrated, the map data may also include road data for all lanes at a toll gate. For instance, a three-lane highway may spread to ten lanes at a toll gate. The display unit 7 may show an appropriate map by determining which lane the car takes.

It should be noted that the present invention is not limited to the illustrated and described embodiments. For example, the mobile body is the car in the embodiments, but the mobile body may be a human. The parking lot/tower may be replaced with a department store or restaurant if the mobile body is a human.

Although the self-contained sensors are the speed sensor 2, angular velocity sensor 3 and acceleration sensor 4 in the above described embodiments, a geomagnetic sensor and/or other sensors may be employed.

This application is based on Japanese patent application No. 2001-137206, and the entire disclosure thereof is incorporated herein by reference.

What is claimed is:

1. A navigation apparatus comprising:
   a current position detector for producing data of a current location of a mobile body on the basis of at least one of navigation parameters of the mobile body and measurement data supplied from a plurality of artificial satellites;
   a storage device for storing map data which includes road data representing one route on a road, the map data also including additional road data for a predetermined region on the road, the additional road data representing another route on the road other than the one route; and
   a map matching device for applying a map matching process to the data produced by the current position detector, using the road data, to determine the current location of the mobile body when the mobile body is not adjacent to the predetermined region, and for applying the map matching process to the data produced by the current position detector, using one of the additional road data and the road data depending upon a moving condition of the mobile body, to determine the current location of the mobile body when the mobile body is adjacent to or in the predetermined region.

2. The navigation apparatus according to claim 1, wherein the map matching device includes a moving condition detector for determining whether a turning movement of the mobile body occurs adjacent to the predetermined region, the turning movement being the moving condition of the mobile body, and the map matching device applies the map matching process using the additional road data to determine the current location of the mobile body when the turning movement of the mobile body is detected by the moving condition detector.

3. The navigation apparatus according to claim 1, wherein the mobile body is at least one of a car and a human.

4. The navigation apparatus according to claim 1 further including a speed sensor, an angular velocity sensor and an acceleration sensor to provide the navigation parameters of the mobile body.

5. The navigation apparatus according to claim 1, wherein the measurement data supplied from the plurality of artificial satellites is GPS data.

6. The navigation apparatus according to claim 1, wherein the current position detector compares the navigation parameters of the mobile body with the measurement data supplied from the plurality of artificial satellites to produce the data of the current location of the mobile body.

7. The navigation apparatus according to claim 1 further including a determination unit to determine whether the mobile body exists within confines of a predetermined structure.

8. The navigation apparatus according to claim 7, wherein the current position detector only uses the navigation parameters of the mobile body to produce the data of the current location of the mobile body when the determination unit determines that the mobile body exists in the confines of the predetermined structure.

9. The navigation apparatus according to claim 1, wherein the road is a multi-lane highway, the road data represents a center lane of the multi-lane highway and the additional road data represents a side lane of the multi-lane highway.

10. A navigation apparatus for determining a current location of a mobile body which moves in a multi-story building, comprising:
    a current position detector for producing data of the current location of the mobile body on the basis of at least one of navigation parameters of the mobile body and measurement data supplied from a plurality of artificial satellites;
    a story detector for detecting a story of the multi-story building in which the mobile body is present;
    a storage device for storing map data which includes a plurality of road data representing a plurality of stories of the multi-story building respectively; and
    a map matching device for retrieving road data representing the story detected by the story detector from the storage device, and applying a map matching process to the data produced by the current position detector, using the retrieved road data, to determine the current location of the mobile body.

11. The navigation apparatus according to claim 10, wherein the story detector detects the story in which the mobile body is present, when the current location of the mobile body detected by the current position detector is within the multi-story building.

12. The navigation apparatus according to claim 10, wherein the mobile body is at least one of a car and a human.

13. The navigation apparatus according to claim 10 further including a speed sensor, an angular velocity sensor and an acceleration sensor to provide the navigation parameters of the mobile body.

14. The navigation apparatus according to claim 10, wherein the measurement data supplied from the plurality of artificial satellites is GPS data.

15. The navigation apparatus according to claim 10, wherein the story detector determines whether the mobile body is moving to another story from a story in which the mobile body is currently present.

16. The navigation apparatus according to claim 15 further including a display unit for showing a map of the story in which the mobile body is present.

17. The navigation apparatus according to claim 16, wherein the display unit shows a map of the another story when the story detector determines that the mobile body is moving to the another story.

18. The navigation apparatus according to claim 10, wherein the current position detector only uses the navigation parameters of the mobile body to produce the data of the current location of the mobile body when the current location of the mobile body detected by the current position detector is within the multi-story building.

19. A method of determining a current location of a mobile device, comprising the steps of:
A) providing map data which includes road data representing one route on a road, the map data also including additional road data for a predetermined region on the road, the additional road data representing another route on the road other than the one route;
B) producing data of a current location of the mobile body on the basis of at least one of information supplied from self-contained sensors and information supplied from a GPS device; and
C) applying a map matching process to the data produced in Step B, using the road data, to determine the current location of the mobile body when the mobile body is not adjacent to the predetermined region, and for applying the map matching process to the data produced in Step B, using either one of the additional road data and the road data depending upon a moving condition of the mobile body, to determine the current location of the mobile body when the mobile body is adjacent to the predetermined region.

20. A method of determining a current location of a mobile body which moves in a multi-story building, comprising the steps of:
A) providing map data which includes a plurality of road data representing a plurality of stories of the multi-story building respectively;
B) producing data of the current location of the mobile body on the basis of at least one of information supplied from self-contained sensors and information supplied from a GPS device;
C) detecting a story of the multi-story building in which the mobile body is present;
D) retrieving road data representing the story detected in Step C from the map data; and
E) applying a map matching process to the data produced in Step B, using the road data retrieved in Step C, to determine the current location of the mobile body.

21. A navigation apparatus, comprising:
a memory that stores first road data representing a first route on a road and that stores second road data representing a second route on the road; and
a controller that performs a map matching routine to determine a current location of a mobile body,
wherein the controller performs the map matching routine based on the first road data to determine the current location when the mobile body is not in a predetermined region of the road,
wherein the controller performs the map matching routine based on the second road data to determine the current location when the mobile body is in the predetermined region.

22. The navigation apparatus according to claim 21, wherein, when the mobile has a first moving condition, the controller performs the map matching routine based on the second road data to determine the current location when the mobile body is in the predetermined region, and
wherein, when the mobile has a second moving condition, the controller performs the map matching routine based on the first road data to determine the current location when the mobile body is in the predetermined region.

23. A navigation apparatus, comprising:
a detector for detecting a detected story of a multi-story building in which a mobile body is present;
a memory that stores first story data that represents a first story of the multi-story building and that stores second story data that represents a second story of the multi-story building; and
a controller that performs a map matching routine,
wherein the controller determines a current location of the mobile body based on the detected story detected by the detector and based on at least one of the first story data and the second story data.

24. The navigation apparatus according to claim 21, wherein the controller determines whether the mobile body exists within confines of a predetermined structure.

25. The navigation apparatus according to claim 24, wherein, when the predetermined structure comprises a multi-story building, the controller determines the current location of the mobile body by determining a story of multi-story building on which the mobile body is located.

26. The navigation apparatus according to claim 21, wherein the road is a multi-lane road, the first road data represents a first lane of the multi-lane road and the second road data represents a second lane of the multi-lane road.

27. The navigation apparatus according to claim 26, wherein the second lane is adjacent to an exit off of the road, and
wherein the first lane is not adjacent to the exit off of the road.

28. The navigation apparatus according to claim 26, wherein the first lane is an interior lane of the road, and
wherein the second lane is an exterior lane of the road.

* * * * *